(12) United States Patent
Yamada

(10) Patent No.: US 10,958,803 B2
(45) Date of Patent: Mar. 23, 2021

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventor: Junya Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/596,821

(22) Filed: Oct. 9, 2019

(65) Prior Publication Data

US 2020/0358912 A1    Nov. 12, 2020

(30) Foreign Application Priority Data

May 7, 2019  (JP) .............................. JP2019-087807

(51) Int. Cl.
*H04N 1/00* (2006.01)
*H04N 1/44* (2006.01)

(52) U.S. Cl.
CPC ....... *H04N 1/0097* (2013.01); *H04N 1/00148* (2013.01); *H04N 1/4433* (2013.01)

(58) Field of Classification Search
None
See application file for complete search history.

(56) References Cited

U.S. PATENT DOCUMENTS

| 9,300,822 | B2 | 3/2016 | Matsuhara et al. | |
| 2011/0032563 | A1* | 2/2011 | Matsuzawa | G06F 3/122 |
| | | | | 358/1.15 |
| 2013/0258382 | A1* | 10/2013 | Sato | G06F 3/1236 |
| | | | | 358/1.13 |
| 2014/0168696 | A1* | 6/2014 | Matsuhara | H04N 1/00384 |
| | | | | 358/1.15 |
| 2015/0381834 | A1* | 12/2015 | Mizuno | H04N 1/00517 |
| | | | | 715/745 |
| 2017/0094101 | A1* | 3/2017 | Saito | H04N 1/32122 |
| 2017/0126926 | A1* | 5/2017 | Saito | H04N 1/32358 |
| 2017/0310849 | A1* | 10/2017 | Hosoda | G06F 3/1236 |
| 2018/0181352 | A1* | 6/2018 | Saito | G06F 3/1267 |
| 2018/0270367 | A1* | 9/2018 | Suzuki | H04N 1/00307 |
| 2019/0068741 | A1* | 2/2019 | Mukai | H04L 63/0442 |

FOREIGN PATENT DOCUMENTS

| JP | 2014-120975 A | | 6/2014 | |
| JP | 2014120975 A | * | 6/2014 | ......... H04N 1/00244 |
| JP | 2018-156378 A | | 10/2018 | |
| JP | 2018156378 A | * | 10/2018 | ......... H04N 1/00307 |
| JP | 2019128633 A | * | 8/2019 | |

\* cited by examiner

*Primary Examiner* — Ted W Barnes
(74) *Attorney, Agent, or Firm* — Oliff PLC

(57) ABSTRACT

An information processing apparatus includes a reading unit, a generation processing unit, a storage controller, and an output unit. The reading unit reads a reading target to generate image data. The generation processing unit performs processing for generating, in an external apparatus, a temporary storage region that is able to be accessed from a terminal apparatus. The storage controller transmits the image data to the external apparatus and causes the image data to be stored into the temporary storage region. The output unit outputs access information for allowing the terminal apparatus to access the temporary storage region, the access information being output in a state in which the access information is able to be acquired by the terminal apparatus.

19 Claims, 8 Drawing Sheets

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-087807 filed May 7, 2019.

BACKGROUND

(i) Technical Field

The present disclosure relates to an information processing apparatus, an information processing system, and a non-transitory computer readable medium.

(ii) Related Art

A technique for reading a reading target such as a document to generate image data, transmitting the image data to an external apparatus such as a server, and causing the image data to be stored into a storage region of the external apparatus has been known.

In Japanese Unexamined Patent Application Publication. No. 2018-156378, an apparatus that transmits a storing method to be used by an electronic apparatus for storing electronic data into a storage device on a network to the electronic apparatus and acquires via the network from the storage device the electronic data stored in the storage device using the storing method by the electronic apparatus, is described.

In Japanese Unexamined Patent Application Publication No. 2014-120975, an information processing system that includes a portable information terminal and an information processing apparatus is described. When a remote-operation application execution unit is activated in a state in which a cloud-service application execution unit is activated, the portable information terminal transmits access information indicating a connection destination for a cloud service corresponding to the cloud-service application execution unit to the information processing apparatus. The information processing apparatus transmits an operation screen including a keyboard shortcut for inputting an instruction to conduct communication between the cloud service indicated by the access information and the information processing apparatus to the portable information terminal. When receiving operation information regarding the keyboard shortcut from the portable information terminal, the information processing apparatus establishes connection with the cloud service and performs transmission and reception of data to and from the cloud service.

SUMMARY

If image data is stored in a permanently available storage region in an external apparatus, there is an increased risk of leakage of the image data.

Aspects of non-limiting embodiments of the present disclosure relate to reducing the risk of leakage of image data in a case where the image data, which is generated by reading a reading target, is stored in a storing region of an external apparatus, compared to a case where image data is stored in a permanently available storage region.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a reading unit, a generation processing unit, a storage controller, and an output unit. The reading unit reads a reading target to generate image data. The generation processing unit performs processing for generating, in an external apparatus, a temporary storage region that is able to be accessed from a terminal apparatus. The storage controller transmits the image data to the external apparatus and causes the image data to be stored into the temporary storage region. The output unit outputs access information for allowing the terminal apparatus to access the temporary storage region, the access information being output in a state in which the access information is able to be acquired by the terminal apparatus.

BRIEF DESCRIPTION OF THE DRAWINGS

Exemplary embodiments of the present disclosure will be described in detail based on the following figures, wherein.

DETAILED DESCRIPTION

Figure 1:
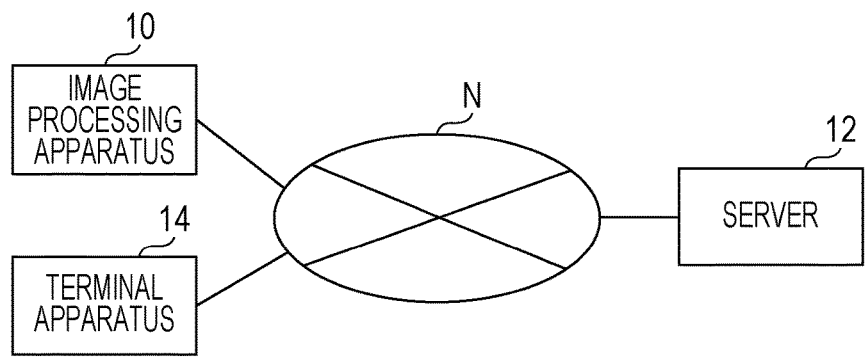
FIG. 1 is a block diagram illustrating a configuration of an information processing system according to an exemplary embodiment.

Hereinafter, an information processing system according to an exemplary embodiment will be described with reference to FIG. 1. FIG. 1 illustrates an example of the configuration of an information processing system according to an exemplary embodiment.

The information processing system according to this exemplary embodiment includes one or more image processing apparatuses 10, one or more servers 12, and one or more terminal apparatuses 14. The information processing system may include other apparatuses.

The image processing apparatus 10, the server 12, and the terminal apparatus 14 may communicate with other apparatuses through a communication path N. The communication path N is, for example, a network such as a local area network (LAN) or the Internet. The communication path N may be established by wired communication or may be established by wireless communication such as Wi-Fi®. Furthermore, the image processing apparatus 10, the server 12, and the terminal apparatus 14 may communicate with other apparatuses by short-range wireless communication or the like without through the communication path N. The short-range wireless communication is, for example, Bluetooth®, a radio frequency identifier (RFID), or near-field communication (NFC).

The image processing apparatus 10 is an apparatus that corresponds to an example of an information processing apparatus and includes an image reading function for reading a reading target to generate image data representing the reading target. Hereinafter, a function for reading a reading target to generate image data representing the reading target will be referred to as "scanning", and the image data will be referred to as "scanned data". A concept category of scanning includes optically reading a reading target by a scanner, photographing a reading target by a camera, and the like. The reading target is, for example, an original such as a document or other three-dimensional objects. The image processing apparatus 10 may be a scanner or a camera that includes the image reading function or a multifunction machine that includes at least one of image processing functions including a printing function, a copying function, and a facsimile function, as well as the image reading function. For example, scanned data generated by the image processing apparatus 10 may be transmitted to the server 12 or the terminal apparatus 14 or may be stored in the image processing apparatus 10.

The server 12 is an apparatus that corresponds to an example of an external apparatus and generates a storage region in which data is to be stored. For example, a storage region referred to as a folder, a box, or the like may be stored in the server 12. The server 12 may be a server used for cloud computing.

In this exemplary embodiment, a temporary storage region in which scanned data generated by the image processing apparatus 10 is to be temporarily stored is generated in the server 12. The temporary storage region is a storage region that is able to be accessed from the terminal apparatus 14. For example, in the case where a generation condition is satisfied, an instruction to generate a temporary storage region is transmitted to the server 12, and the temporary storage region is generated in the server 12. The case where a generation condition is satisfied is, for example, a case where a function for using a temporary storage region is selected, a case where an instruction to execute the function is issued, a case where the function is executed, or the like. The function is, for example, a "scan to server function". The "scan to server function" is a function for executing scanning, transmitting scanned data generated by the scanning to the server 12 from the image processing apparatus 10, and causing the scanned data to be stored into a temporary storage region in the server 12.

The temporary storage region is a storage region that is deleted from the server 12 in the case where a deletion condition is satisfied even without issuance of an explicit deletion instruction by a user. The case where a deletion condition is satisfied is, for example, a case where an event which causes deletion of a temporary storage region occurs in an apparatus different from the server 12, a case where a condition regarding time is satisfied, a case where a deletion instruction is notified to the server 12 at a specific timing, or the like. The event which causes deletion of a temporary storage region for example, a case where execution of the function for using a temporary storage region is finished at the image processing apparatus 10, a case where the terminal apparatus 14 has downloaded scanned data stored in the temporary storage region, or the like. For example, a notification of ending of the function is transmitted from the image processing apparatus 10 to the server 12 or a notification of ending of downloading is transmitted from the terminal apparatus 14 to the server 12. These notifications transmitted from apparatuses different from the server 12 to the server 12 correspond to examples of an instruction to delete a temporary storage region. For example, when execution of the "scan to server function" is finished, when scanned data stored in a temporary storage region is downloaded into the terminal apparatus 14, when a predetermined time has passed since a specific point in time, or when a deletion instruction is notified at a specific timing, the temporary storage region is deleted from the server 12. The user mentioned above is, for example, a user who uses the image processing apparatus 10, a user who uses the terminal apparatus 14, an administrator who manages the image processing apparatus 10, the server 12, or the information processing system, or the like.

As another example, in the case where the deletion condition is satisfied, data stored in the storage region may be deleted, without the storage region itself being deleted. Such a storage region may also be an example of a temporary storage region.

The server 12 may not include a temporary storage region but may include a permanent storage region. For example, the permanent storage region is a storage region that is not deleted from the server 12 even when the above-mentioned deletion condition is satisfied but is deleted from the server 12 when an explicit deletion instruction is provided by the user. Obviously, the temporary storage region may be deleted when an explicit deletion instruction is provided by a user.

The terminal apparatus 14 is, for example, an apparatus such as a personal computer (hereinafter, referred to as a "PC"), a tablet PC, a smartphone, or a mobile phone. For example, the terminal apparatus 14 is a portable terminal apparatus such as a tablet PC, a smartphone, or a mobile phone.

Figure 2:
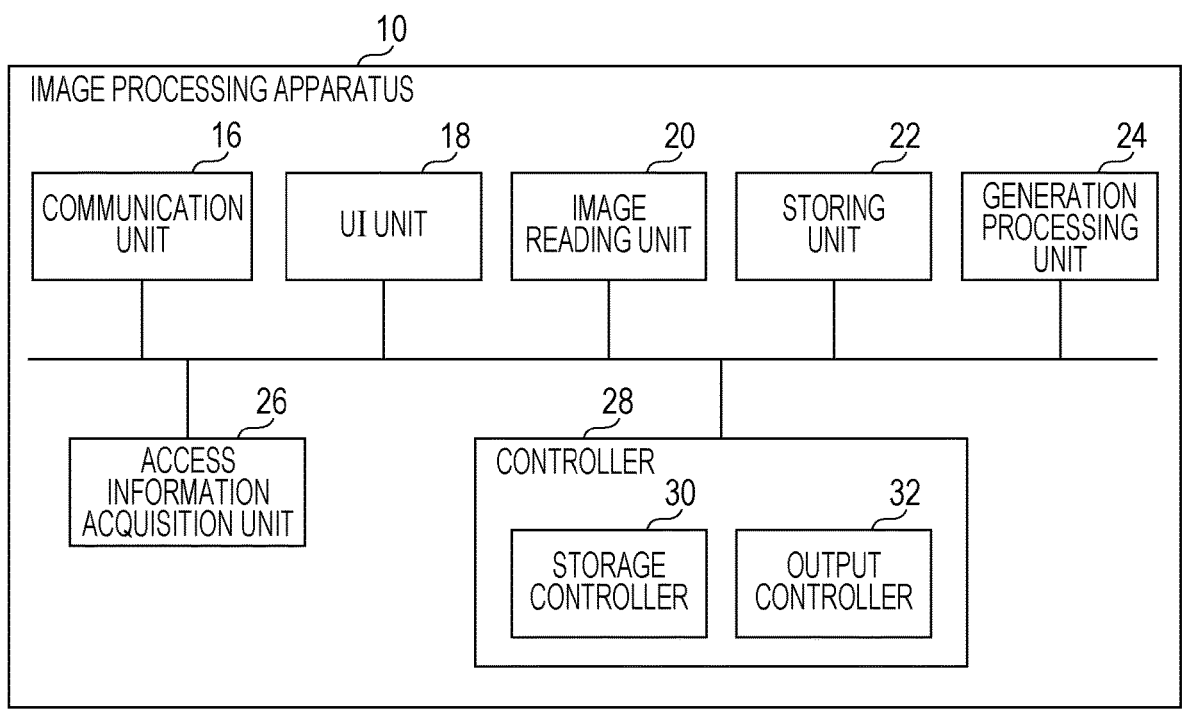
FIG. 2 is s block diagram illustrating a configuration of an image processing apparatus according to an exemplary embodiment.

Next, a configuration of the image processing apparatus 10 will be described in detail with reference to FIG. 2. FIG. 2 illustrates an example of the configuration of the image processing apparatus 10.

A communication unit 16 is a communication interface and includes a function for transmitting information to other apparatuses and a function for receiving information from other apparatuses. The communication unit 16 may include a wireless communication function or a wired communication function. The communication unit 16 may communicate with other apparatuses through the communication path N or may communicate with other apparatuses using short-range wireless communication or the like without through the communication path N.

A UI unit 18 is a user interface includes a display part and an operation part. The display part is a display device such as a liquid crystal display. The operation part is an input device such as a keyboard, input keys, and an operation panel. The UI unit 18 may be a UI unit such as a touch panel including the display part and the operation part.

An image reading unit 20 is configured to read a reading target to generate image data representing the reading target. That is, the image reading unit 20 is configured to scan a reading target to generate scanned data representing the reading target. Scanning by the image reading unit 20 is executed by, for example, a scanner or a camera.

A storing unit 22 includes one or more storage regions in which various types of information are stored. For example, each storage region includes one or more storage devices (for example, physical drives such as hard disk drives, memories, or the like) provided in the image processing apparatus 10. For example, scanned data and the like are stored in the storing unit 22.

A generation processing unit 24 is configured to perform processing for generating a temporary storage region in the server 12. The processing for generating a temporary storage region is, for example, instructing the server 12 to generate a temporary storage region. For example, in the case where the above-mentioned generation condition is satisfied, the generation processing unit 24 instructs the server 12 to generate a temporary storage region. Information indicating the instruction to generate a temporary storage region is transmitted from the image processing apparatus 10 to the server 12. Then, the temporary storage region is generated in the server 12 in accordance with the generation instruction. Identification information for identifying the temporary storage region is associated with the temporary storage region.

Furthermore, the processing for generating a temporary storage region may be specifying, as identification information of the temporary storage region, identification information that is not the same as identification information of other temporary storage regions and instructing the server 12 to generate the temporary storage region. For example, other temporary storage regions are temporary storage regions that have already been provided in the server 12 before generation of the temporary storage region, temporary storage regions that were once provided in the server 12, or the like. For example, in the case where the above-mentioned generation condition is satisfied, the generation processing unit 24 specifies identification information that is not the same as identification information of other temporary storage regions and instructs the server 12 to generate a temporary storage region. For example, the generation processing unit 24 specifies, as identification information of the temporary storage region, a combination of apparatus identification information of the image processing apparatus 10 and date and time information. The apparatus identification information of the image processing apparatus 10 is information for identifying the image processing apparatus 10 and is, for example, a serial number, address information (for example, IP address information, MAC address information, or the like), or the like of the image processing apparatus 10. The date and time information is, for example, date and time at which the "scan to server function" was selected by the user, date and time at which an instruction to execute the "scan to server function" was provided by the user, date and time at which the "scan to server function" was executed, date and time at which an instruction to generate a temporary storage region was provided, or the like.

Furthermore, the generation processing unit 24 may perform processing for deleting a temporary storage region from the server 12. The processing for deleting a temporary storage region is, for example, instructing the server 12 to delete a temporary storage region. For example, when execution of the "scan to server function" is finished, when a predetermined time has passed since a specific point in time, or the like, the generation processing unit 24 instructs the server 12 to delete a temporary storage region. The information indicating the instruction to delete a temporary storage region is transmitted from the image processing apparatus 10 to the server 12. Then, the temporary storage region is deleted from the server 12 in accordance with the deletion instruction. The temporary storage region may not be deleted, but data stored in the temporary storage region may be deleted, in accordance with the deletion instruction.

An access information acquisition unit 26 is configured to acquire access information for allowing the terminal apparatus 14 to access a temporary storage region from the server 12. For example, when a temporary storage region is generated in the server 12 in accordance with the generation instruction mentioned above, access information regarding the temporary storage region is generated by the server 12, and the access information is transmitted from the server 12 to the image processing apparatus 10. The access information acquisition unit acquires the access information transmitted from the server 12. The access information regarding a temporary storage region is information indicating the location of the temporary storage region and is, for example, address information such as a uniform resource locater (URL).

The processing for generating a temporary storage region may include processing for generating access information. For example, the generation processing unit 24 may specify access information that is not the same as access information of other temporary storage regions and instruct the server 12 to generate the temporary storage region.

A controller 28 is configured to control operations of the units of the image processing apparatus 10. Furthermore, the controller 28 includes a storage controller 30 and an output controller 32.

The storage controller 30 is configured to transmit scanned data to the server 12 and cause the scanned data to be stored into a temporary storage region.

The output controller 32 is configured to output access information acquired by the access information acquisition unit 26. For example, the output controller 32 may generate barcode or two-dimensional code representing access information and cause the barcode or two-dimensional code to be displayed on the display part of the UI unit 18. The output controller 32 may transmit access information using short-range wireless communication by the communication unit 16. The output controller 32 may cause a character string representing access information (for example, a character string representing an URL) to be displayed on the display part of the UI unit 18.

Figure 3:
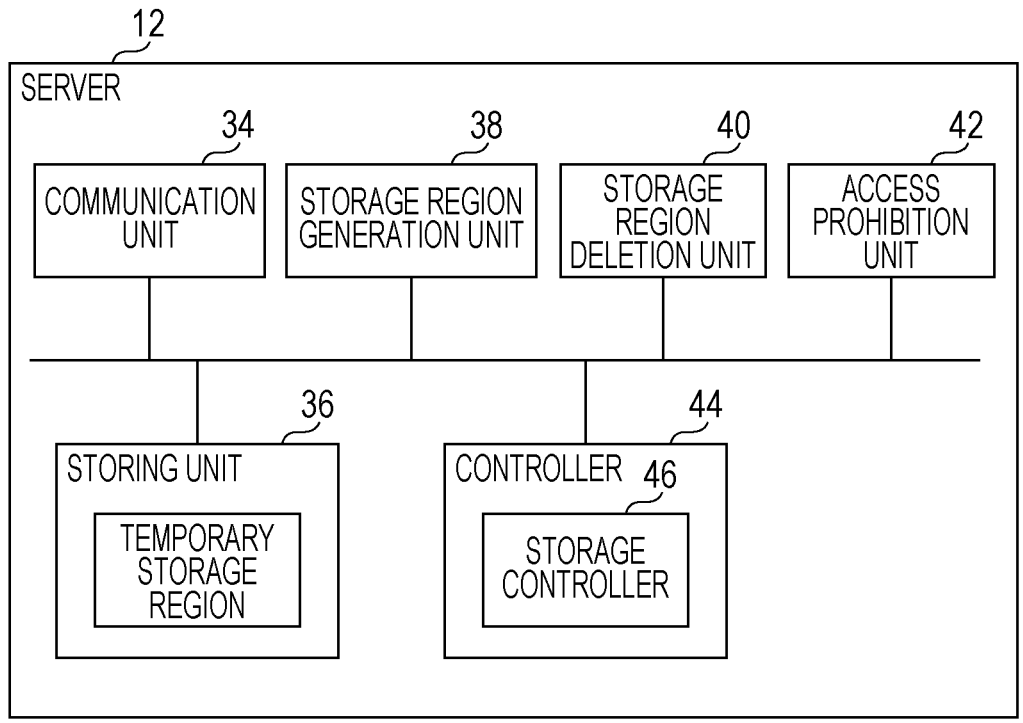
FIG. 3 is a block diagram illustrating a configuration of a server according to an exemplary embodiment.

Next, a configuration of the server 12 will be described in detail with reference to FIG. 3. FIG. 3 illustrates an example of the configuration of the server 12.

A communication unit 34 is a communication interface and includes a function for transmitting information to other apparatuses and a function for receiving information from other apparatuses. The communication unit 34 may include a wireless communication function or a wired communication function. The communication unit 34 may communicate with other apparatuses through the communication path N or may communicate with other apparatuses using short-range wireless communication or the like without through the communication path N.

A storing unit 36 includes one or more storage regions in which various types of information are stored. For example, each storage region includes one or more storage devices (for example, physical drives such as hard disk drives, memories, or the like) provided in the server 12.

A temporary storage region is generated in the storing unit 36. Scanned data transmitted from the image processing apparatus 10 is stored in the temporary storage region. Obviously, data different from scanned data may be stored in the temporary storage region. Furthermore, a permanent storage region may be generated in the temporary storage region.

A storage region generation unit 38 is configured to generate a temporary storage region in the storing unit 36. For example, when receiving information indicating an instruction to generate a temporary storage region, which is transmitted from the image processing apparatus 10, the storage region generation unit 38 generates the temporary storage region in the storing unit 36 in accordance with the generation instruction. In the case where identification information of the temporary storage region is not specified by the image processing apparatus 10, the storage region generation unit 38 generates identification information that is not the same as identification information of other temporary storage regions, and associates the generated identification information with the new temporary storage region. For example, the name of the temporary storage region, identification information of a user (for example, a username, a user ID, or the like) who has issued the instruction to generate the temporary storage region, identification information of a user who is logged in to the image processing apparatus 10, or the like may be used as identification information of the temporary storage region. The identification information of the temporary storage region may be changed by the user. In the case where identification information of the temporary storage region is specified by the image processing apparatus 10, the storage region generation unit 38 associates the specified identification information with the new temporary storage region.

Furthermore, the storage region generation unit 38 generates access information for allowing the terminal apparatus 14 to access a temporary storage region. The storage region generation unit 38 generates access information, that is not the same as access information for allowing access to other temporary storage regions. That is, the storage region generation unit 38 generates different access information for individual temporary storage regions. Generated access information is transmitted from the server 12 to the image processing apparatus 10.

The storage capacities of temporary storage regions may be the same or may be changed according to the usage status of the image processing apparatus 10. For example, the storage region generation unit 38 may increase the storage capacity of a temporary storage region as the number of times that the "scan to server function" is used increases. Furthermore, in the case where a temporary storage region is generated after scanning is executed, the generation processing unit 24 may estimate the storage capacity required to store scanned data, based on the volume of the scanned data generated by the scanning, and instruct the server 12 to generate the temporary storage region having the estimated storage capacity. The storage region generation unit 38 generates the temporary storage region having the estimated storage capacity in accordance with the generation instruction. For example, the generation processing unit 24 instructs the server 12 to generate a temporary storage region having a storage capacity larger than the total volume of scanned data. In the case where a charge is incurred for using a temporary storage region, the storage region generation unit 38 may change the storage capacity of the temporary storage region according to the amount of money.

A storage region deletion unit 40 is configured to delete a temporary storage region from the storing unit 36. For example, in the case where the deletion condition mentioned above is satisfied, the storage region deletion unit 40 deletes a temporary storage region from the storing unit 36. For example, when receiving information indicating an instruction to delete a temporary storage region, which is transmitted from the image processing apparatus 10, the storage region deletion unit 40 deletes the temporary storage region from the storing unit 36 in accordance with the deletion instruction. In the case where the terminal apparatus 14 has downloaded scanned data, the storage region deletion unit 40 may delete a temporary storage region in which the scanned data is stored from the storing unit 36.

An access prohibition unit 42 is configured, in a case where a certain terminal apparatus 14 first accesses a temporary storage region based on access information, to prohibit access to the temporary storage region from terminal apparatuses 14 other than the terminal apparatus 14. The access prohibition unit 42 acquires terminal identification information of the terminal apparatus 14 that first accesses a temporary storage region and associates the terminal identification information of the terminal apparatus 14 with the temporary storage region. For example, the case where a terminal apparatus 14 accesses the server 12, terminal identification information of the terminal apparatus 14 is transmitted from the terminal apparatus 14 to the server 12, and the access prohibition unit 42 acquires the terminal identification information of the terminal apparatus 14. The access prohibition unit 42 permits access to the temporary storage region from the terminal apparatus 14 having the terminal identification information associated with the temporary storage region and prohibits access to the temporary storage region from the other terminal apparatuses 14 (that is, does not permit access to the temporary storage region from the other terminal apparatuses 14). The terminal identification information of the terminal apparatus 14 is information for identifying the terminal apparatus 14 and is, for example, a serial number, address information (for example, IP address information, MAC address information, or the like) of the terminal apparatus 14. Identification information of a user (for example, a username, a user ID, an e-mail address, or the like) who uses the terminal apparatus 14 may be used as the terminal identification information of the terminal apparatus 14. The access prohibition unit 42 may not be provided in the server 12.

A controller 44 is configured to control operations of the units of the server 12. Furthermore, the controller 44 includes a storage controller 46.

The storage controller 46 is configured to store scanned data transmitted from the image processing apparatus 10 into a temporary storage region.

The storage region generation unit 38 may associate a temporary storage region with apparatus identification information of the image processing apparatus 10 that has issued an instruction to generate the temporary storage region. In this case, when scanned data is transmitted from the image processing apparatus 10 to the server 12, the storage controller 46 stores the scanned data into a temporary storage region associated with the apparatus identification information of the image processing apparatus 10. For example, in the case where the information processing system includes a plurality of image processing apparatuses 10, when the "scan to server function" is executed at each of the image processing apparatuses 10, the storage region generation unit 38 generates a temporary storage region for each of the image processing apparatuses 10 in the storing unit 36. Scanned data generated by the image processing apparatus 10 is stored into the temporary storage region associated with the apparatus identification information of the image processing apparatus 10.

Figure 4:
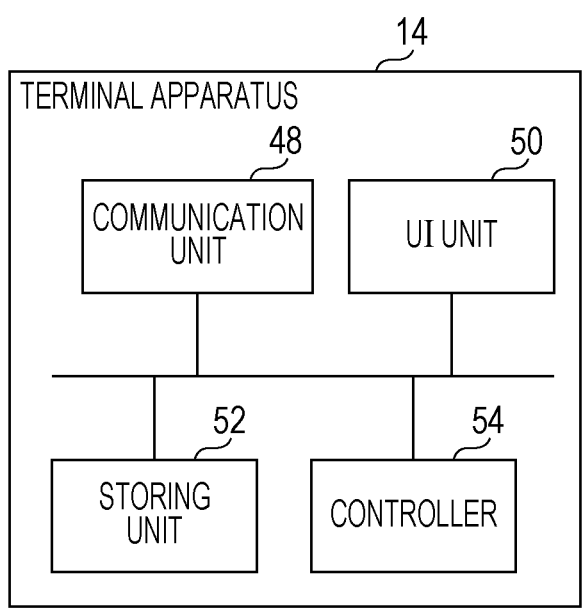
FIG. 4 is a block diagram illustrating a configuration of a terminal apparatus.

Next, a configuration of the terminal apparatus 14 will be described in detail with reference to FIG. 4. FIG. 4 illustrates an example of the configuration of the terminal apparatus 14.

A communication unit 48 is a communication interface and includes a function for transmitting information to other apparatuses and a function for receiving information from other apparatuses. The communication unit 48 may include a wireless communication function or a wired communication function. The communication unit 48 may communicate with other apparatuses through the communication path N or may communicate with other apparatuses using short-range wireless communication or the like without through the communication path N.

A UI unit 50 is a user interface and includes a display part and an operation part. The display part is a display device such as a liquid crystal display. The operation part is an input device such as a keyboard, input keys, and an operation panel. The UI unit 50 may be a UI unit such as a touch panel including the display part and the operation part.

A storing unit 52 includes one or more storage regions in which various types of information are stored. For example, each storage region includes one or more storage devices (for example, physical drives such as hard disk drives, memories, or the like) provided in the terminal apparatus 14. For example, scanned data and the like downloaded from the server 12 are stored in the storing unit 52.

A controller 54 is configured to control operations of the units of the terminal apparatus 14.

The terminal apparatus 14 may include a photographing unit such as a camera.

Figure 5:
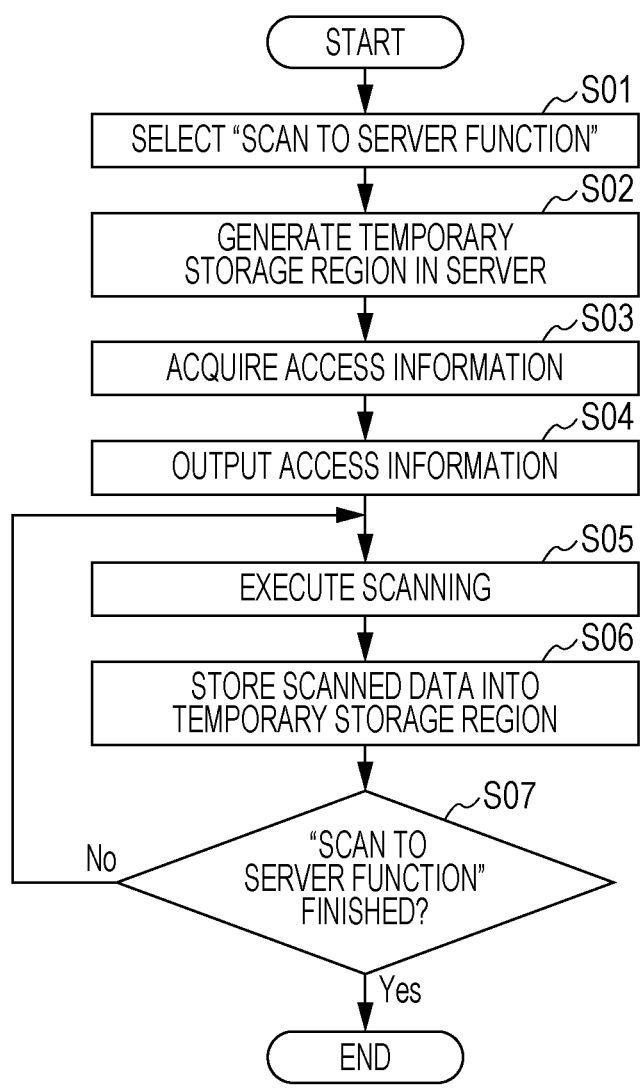
FIG. 5 is a flowchart illustrating an operation of an image processing apparatus.

Next, an example of an operation of the image processing apparatus 10 will be described with reference to FIG. 5. FIG. 5 is a flowchart illustrating an example of an operation of the image processing apparatus 10.

For example, the controller 28 of the image processing apparatus 10 causes a main screen to be displayed on the display part of the UI unit 18 of the image processing apparatus 10. On the main screen, for example, a list of functions included in the image processing apparatus 10 is displayed.

When a user operates the UI unit 18 of the image processing apparatus 10 to select the "scan to server function" from the list (S01), the generation processing unit 24 performs processing for generating a temporary storage region in the server 12. Accordingly, a temporary storage region is generated in the server 12 (S02).

Access information of the temporary storage region is generated by the server 12 and is transmitted from the server 12 to the image processing apparatus 10. The access information acquisition unit 26 acquires the access information of the temporary storage region transmitted from the server 12 (S03).

Next, the output controller 32 outputs the access information acquired by the access information acquisition unit 26 (S04).

Next, the image reading unit 20 scans a reading target (for example, an original) to generate scanned data representing the reading target (S05). Scanning may be executed before the temporary storage region is generated in the server 12, before the access information acquisition unit 26 acquires the access information, or before the output controller 32 outputs the access information.

The storage controller 30 transmits the scanned data to the server 12 and causes the scanned data to be stored into the temporary storage region (S06).

When execution of the "scan to server function" is finished (S07; Yes), the process ends. For example, when the user operates the UI unit 18 to issue an instruction to finish the "scan to server function", execution of the "scan to server function" is finished.

In the case where execution of the "scan to server function" is not finished (S07; No), the process returns to step S05. When further scanning is executed, scanned data generated by the scanning is transmitted from the image processing apparatus 10 to the server 12 and is stored into the temporary storage region. One or more scanned data generated by scanning during a period from the beginning of execution of the "scan to server function" to the ending of the execution of the "scan to server function" are stored in the same temporary storage region.

Figure 6:
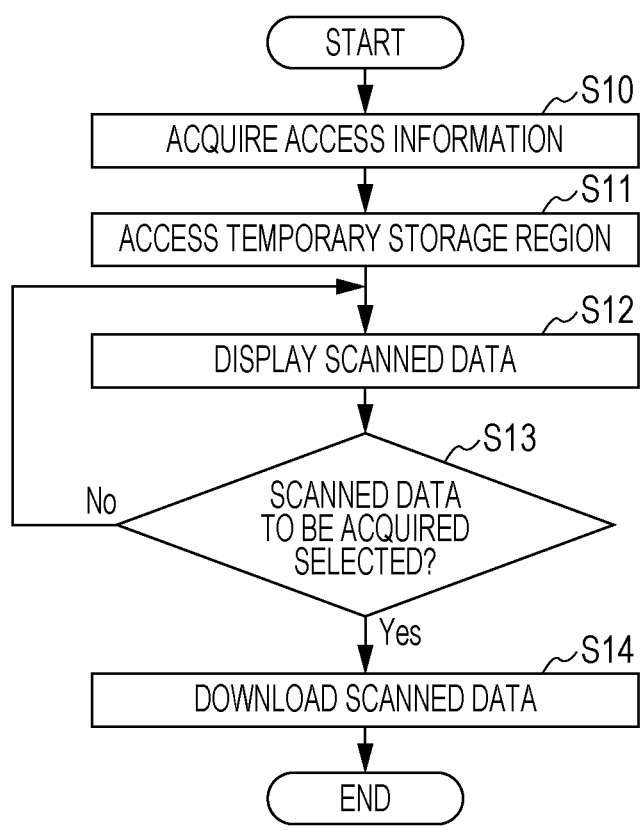
FIG. 6 is a flowchart illustrating an operation of a terminal apparatus.

Next, an example of an operation of the terminal apparatus 14 will be described with reference to FIG. 6. FIG. 6 is a flowchart illustrating an example of an operation of the terminal apparatus 14.

First, the terminal apparatus 14 acquires access information output from the image processing apparatus 10 (S10). For example, the terminal apparatus 14 may acquire the access information by photographing barcode or two-dimensional code representing the access information or may acquire the access information using short-range wireless communication.

Next, the terminal apparatus 14 accesses a temporary storage region generated in the server 12, based on the access information acquired as described above (S11). For example, a program for a Web browser has been installed in the terminal apparatus 14. When a user operates the UI unit 50 to start the Web browser, the Web browser accesses the temporary storage region generated in the server 12, based on the access information. That is, the Web browser accesses the temporary storage region generated at a location indicated by the access information. In the case where a character string (for example, a character string representing a URL) representing the access information is displayed on the display part of the UI unit 18 of the image processing apparatus 10, the user who uses the terminal apparatus 14 may read the character string and manually input the character string representing the access information to the terminal apparatus 14.

When the Web browser accesses the temporary storage region, the controller 54 of the terminal apparatus 14 causes the list of one or more scanned data stored in the temporary storage region to be displayed on the display part of the UI unit 50 of the terminal apparatus 14 (S12). For example, the list is displayed on the Web browser.

When the user operates the UI unit 50 of the terminal apparatus 14 to select one or more scanned data as an acquisition target from the list (S13; Yes), the terminal apparatus 14 downloads the one or more scanned data selected by the user from the temporary storage region (S14).

In the case where the user does not select scanned data as an acquisition target (S13; No), the list continues to be displayed on the display part of the UI unit 50.

Hereinafter, Examples will be explained in detail.

Example 1

Figure 7:
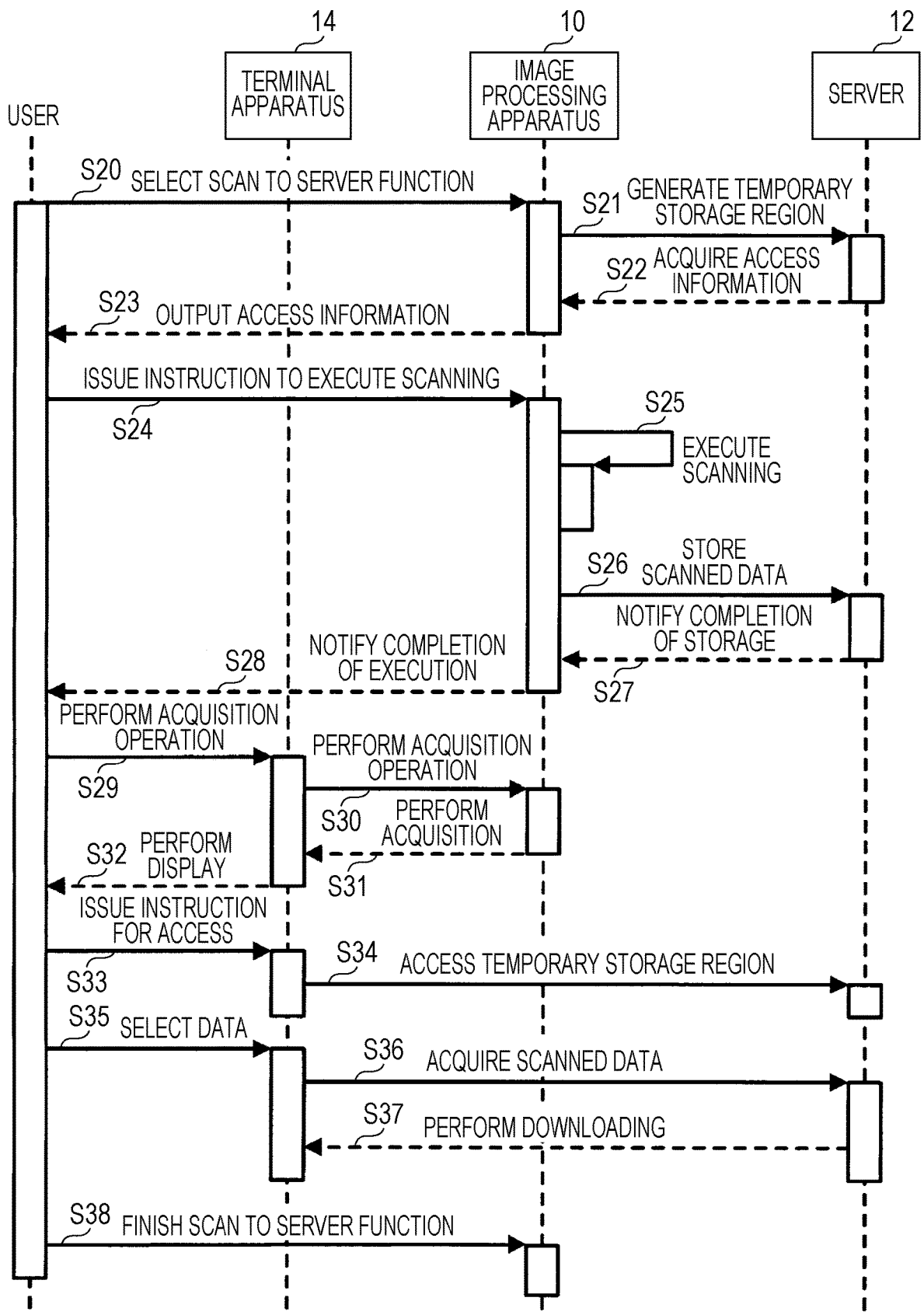
FIG. 7 is a sequence diagram illustrating the flow of a process according to Example 1.

Next, a process according to Example 1 will be described with reference to FIG. 7. FIG. 7 is a sequence diagram illustrating an example of the flow of a process according to Example 1.

At the image processing apparatus 10, when a user operates the UI unit 18 to select the "scan to server function" (S20), the generation processing unit 24 instructs the server 12 to generate a temporary storage region (S21).

At the server 12, the storage region generation unit 38 generates a temporary storage region in the storing unit 36 in accordance with the instruction, and generates access information for accessing the temporary storage region. Apparatus identification information of the image processing apparatus 10 that has issued the instruction to generate a temporary storage region may be transmitted from the image processing apparatus 10 to the server 12, and the storage region generation unit 38 may associate the apparatus identification information with the temporary storage region. The access information is transmitted from the server 12 to the image processing apparatus 10, and the access information acquisition unit 26 acquires the access information (S22).

At the image processing apparatus 10, the output controller 32 outputs the access information acquired by the access information acquisition unit 26 (S23). For example, the output controller 32 may cause barcode or two-dimensional code representing the access information to be displayed on the display part of the UI unit 18, may transmit the access information using short-range wireless communication by the communication unit 16, or may cause a character string (for example, a character string representing a URL) representing the access information to be displayed on the display part of the UI unit 18. When the access information acquisition unit 26 acquires the access information, the output controller 32 may cause information prompting the user to acquire the access information to be displayed on the display part of the UI unit 18 or may produce sound representing the information prompting the user to acquire the access information. Furthermore, the output controller 32 may cause information indicating that the temporary storage region has been generated in the server 12 or information indicating that the access information has been acquired to be displayed on the display part of the UI unit 18.

For example, the period during which the output controller 32 outputs the access information may be a period from the point in time at which the access information acquisition unit 26 acquires the access information to the point in time at which execution of the "scan to server function" is finished (for example, the point in time at which the user issues an instruction to finish the "scan to server function"), a period from the point in time at which the access information acquisition unit 26 acquires the access information to the point in time at which the terminal apparatus 14 acquires the access information, or a period from the point in time at which the access information acquisition unit 26 acquires the access information to the time when a predetermined time has passed since the acquisition of the access information by the access information acquisition unit 26. The output controller 32 may output the access information after the point in time when the predetermined time has passed since the point in time at which the access information acquisition unit 26 acquires the access information or may output the access information when the user issues the output instruction using the UI unit 18. The output controller 32 may output the access information until the user issues an output ending instruction using the UI unit 18.

In the case where the user is logged in to the image processing apparatus 10, the output controller 32 may output the access information until the user logs out of the image processing apparatus 10. The user is able to log into the image processing apparatus 10 by inputting authenticating information (for example, a user ID, a password, bio-information, or the like) to the image processing apparatus 10.

The "scan to server function" may be a function that is available when the user is logged in to the image processing apparatus 10. That is, in the case where the user is not logged in to the image processing apparatus 10, execution of the "scan to server function" may be prohibited.

Furthermore, when the user is logged in to the image processing apparatus 10, the controller 28 of the image processing apparatus 10 may cause information indicating operation history of the user to be displayed on the display part of the UI unit 18 of the image processing apparatus 10. Operation history for each user is recorded by the controller 28, and information indicating the operation history of the user is stored in the storing unit 22. For example, acquisition of access information is recorded as operation history, and the access information is displayed as information included in the information indicating the operation history on the display part of the UI unit 18. The user may read the access information to access a temporary storage region. In the case where the user deletes access information included in information indicating operation history, the generation processing unit 24 may perform processing for deleting a temporary storage region that is able to be accessed based on the access information.

At the image processing apparatus 10, when the user operates the UI unit 18 to issue an instruction to execute scanning (S24), the image reading unit 20 executes scanning to generate one or more scanned data (S25).

The storage controller 30 transmits the one or more scanned data to the server 12 and causes the one or more scanned to be stored into the temporary storage region (S26). More particularly, the storage controller 30 transmits the one or more scanned data to the server 12, and instructs the server 12 to store the one or more scanned data into the temporary storage region. The storage controller 46 of the server 12 stores the one or more scanned data into the temporary storage region in accordance with the instruction. The storage controller 46 stores the scanned data transmitted from the image processing apparatus 10 to the server 12 into the temporary storage region associated with the apparatus identification information of the image processing apparatus 10 that has transmitted the scanned data to the server 12. One or more scanned data generated by scanning during the period from the beginning of execution of the "scan to server function" to the ending of the execution of the "scan to server function" are stored into the same temporary storage region.

In the case where the scanned data have been stored in the temporary storage region, the storage controller 46 of the server 12 transmits information indicating that storing of the scanned data is completed to the image processing apparatus 10 (S27).

When receiving the information indicating that storing of the scanned data is completed from the server 12, the controller 28 of the image processing apparatus 10 causes the information to be displayed on the display part of the UI unit 18 of the image processing apparatus 10, and the user is thus notified that storing of the scanned data into the temporary storage region is completed (S28).

Next, when the user who uses the terminal apparatus 14 performs an operation for acquiring the access information (S29), the terminal apparatus 14 executes an operation for acquiring the access information from the image processing apparatus 10 (S30) and acquires the access information as the result of execution of the operation (S31). In the case where barcode or two-dimensional code representing the access information is displayed on the display part of the UI unit 18 of the image processing apparatus 10, when the user photographs the barcode or two-dimensional code by a camera provided at the terminal apparatus 14, the terminal apparatus 14 acquires the access information. As another example, the terminal apparatus 14 may use short-range wireless communication to receive the access information transmitted from the image processing apparatus 10. For example, when the user brings the terminal apparatus 14 close to the image processing apparatus 10, the terminal apparatus 14 acquires the access information from the image processing apparatus 10 through short-range wireless communication. The acquired access information may be displayed on the display part of the UI unit 50 of the terminal apparatus 14 (S32). In the case where a character string representing the access information is displayed on the display part of the UI unit 18, the user may read the character string and manually input the character string into the terminal apparatus 14.

When the user operates the UI unit 50 of the terminal apparatus 14 to issue an instruction to access the temporary storage region (S33), the terminal apparatus 14 accesses the temporary storage region generated in the server 12, based on the access information (S34). The controller 54 of the terminal apparatus 14 causes the list of the one or more scanned data stored in the temporary storage region to be displayed on the display part of the UI unit 50.

When the user operates the UI unit 50 of the terminal apparatus 14 to select one or more scanned data as an acquisition target from the list (S35), the terminal apparatus 14 requires the server 12 to acquire the selected one or more scanned data (S36) and downloads the selected one or more scanned data from the server 12 (S37).

During the period until deletion of the temporary storage region, the terminal apparatus 14 may access the temporary storage region a plurality of times. Furthermore, during the period until deletion of the temporary storage region, the terminal apparatus 14 may download one or more scanned data a plurality of times. The user may operate a different terminal apparatus 14 so that the different terminal apparatus 14 may download the scanned data. That is, one or more terminal apparatuses 14 may access the temporary storage region to download the scanned data, based on the access information.

At the image processing apparatus 10, when the user operates the UI unit 18 to issue an instruction to finish execution of the "scan to server function" (S38) the controller 28 of the image processing apparatus 10 finishes the execution of the "scan to server function".

By causing scanned data to be stored in a temporary storage region, the risk of leakage of the scanned data may be reduced, compared to a case where scanned data is stored in a permanently available storage region.

When execution of the "scan to server function" is finished, the generation processing unit 24 instructs the server 12 to delete the temporary storage region. Information indicating the instruction to delete the temporary storage region is transmitted from the image processing apparatus 10 to the server 12, and the storage region deletion unit 40 of the server 12 deletes the temporary storage region in accordance with the deletion instruction. For example, the generation processing unit 24 transmits the apparatus identification information of the image processing apparatus 10, along with the information indicating the instruction to delete the temporary storage region, to the server 12. The storage region deletion unit 40 deletes the temporary storage region associated with the apparatus identification information.

For each execution of the "scan to server function", one temporary storage region may be used. That is, when the "scan to server function" is executed, one temporary storage region is generated in the server 12 in accordance with the execution, and scanned data generated by scanning by the image processing apparatus 10 to which an instruction for the execution has been issued is stored into the temporary storage region. A user who has issued the instruction for the execution may download the scanned data from the temporary storage region, using the terminal apparatus 14. When the execution of the "scan to server function" is finished, the temporary storage region is deleted, and the temporary storage region is thus not able to be used.

As another example, the generation processing unit 24 may store information indicating the date and time at which the temporary storage region was generated, and the generation processing unit 24 may instruct the server 12 to delete the temporary storage region when a predetermined period has passed since the date and time. As still another example, when a predetermined period has passed since the point in time at which execution of the "scan to server function" is finished, the generation processing unit 24 may instruct the server 12 to delete the temporary storage region. For example, the generation processing unit 24 transmits the apparatus identification information of the image processing apparatus 10, along with information indicating ending of execution of the "scan to server function", to the server 12. The storage region deletion unit 40 deletes the temporary storage region associated with the apparatus identification information.

As still another example, the storage region deletion unit 40 may store information indicating the date and time at which the temporary storage region was generated, and the storage region deletion unit 40 may delete the temporary storage region when a predetermined period has passed since the date and time.

The predetermined period mentioned above may be changed by a user who uses the image processing apparatus 10 or the terminal apparatus 14, an administrator who manages the image processing apparatus 10 or the information processing system, or the like. For example, the user who uses the image processing apparatus 10 may operate the UI unit 18 to set the duration of the period.

As still another example, when scanned data stored in the temporary storage region is downloaded by the terminal apparatus 14, the storage region deletion unit 40 may delete the temporary storage region. For example, when all the scanned data stored in the temporary storage region are downloaded by the terminal apparatus 14, the storage region deletion unit 40 deletes the temporary storage region.

A determination as to whether the temporary storage region is to be deleted when execution of the "scan to server function" is finished, the temporary storage region is to be deleted when the predetermined period has passed, or the temporary storage region is to be deleted when scanned data are downloaded may be selected by the user who uses the image processing apparatus 10 or the terminal apparatus 14, an administrator, or the like.

As still another example, in the case where a temporary storage region is generated in the server 12 by execution of the "scan to server function" during a period from user's logging into the image processing apparatus 10 to logging out of the image processing apparatus 10, when the user is logged out of the image processing apparatus 10 and then logged in to the image processing apparatus 10 again, the generation processing unit 24 may perform processing for deleting the temporary storage region. In the case where the user is logged in to the image processing apparatus 10 again and scanning is then executed, the generation processing unit 24 may perform processing for deleting the temporary storage region. In the case where the user is logged in to the image processing apparatus 10 again and the "scan to server function" is then executed, a new temporary storage region is generated in the server 12, and new access information is transmitted from the server 12 to the image processing apparatus 10. Before the temporary storage region is deleted, the output controller 32 may cause a confirmation screen for deletion and access information of the temporary storage region to be deleted to be displayed on the display part of the UI unit 18.

After execution of the "scan to server function" is finished and before the next execution of the "scan to server function" is started, the generation processing unit 24 may perform processing for generating a temporary storage region to be used for the next execution of the "scan to server function". Accordingly, before the next execution of the "scan server function" is started, the storage region generation unit 38 generates a temporary storage region in advance. The generation processing unit 24 may change the number of temporary storage regions generated in advance, according to the usage status of the "scan to server function". For example, the generation processing unit 24 may increase the number of temporary storage regions to be generated in advance as the number of times that the "scan to server function" is used increases.

Example 2

Figure 8:
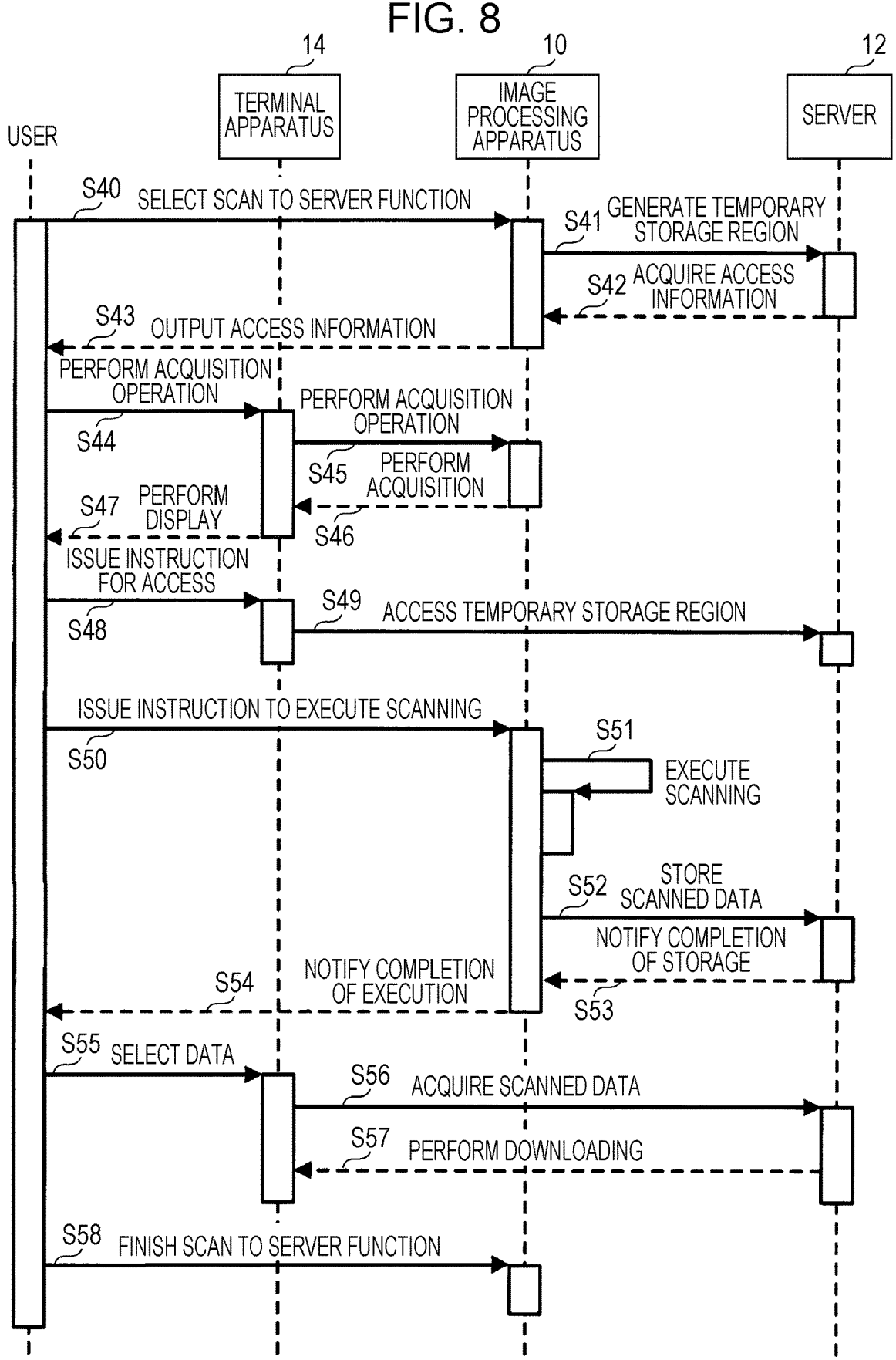
FIG. 8 is a sequence diagram illustrating the flow of a process according to Example 2.

Next, a process according to Example 2 will be described with reference to FIG. 8. FIG. 8 is a sequence diagram illustrating an example of the flow of the process according to Example 2.

In Example 1 described above, the process is performed in the order of execution of scanning by the image processing apparatus 10, acquisition of access information by the terminal apparatus 14, and access to a temporary storage region from the terminal apparatus 14. In Example 2, the process is performed in the order of acquisition of access information by the terminal apparatus 14, access to a temporary storage region by the terminal apparatus 14, and execution of scanning by the image processing apparatus 10. The process according to Example 2 will be described in detail below.

Processing of steps S40 to S43 is the same as the processing of steps S20 to S23 illustrated in FIG. 7.

Processing of steps S44 to S49 is the same as the processing of steps S29 to S34 illustrated in FIG. 7. That is, in Example 2, before scanning is executed, the terminal apparatus 14 acquires access information from the image processing apparatus 10 and accesses a temporary storage region.

Processing of steps S50 to S54 is the same as the processing of steps S24 to S28 illustrated in FIG. 7. That is, in Example 2, after the terminal apparatus 14 accesses the temporary storage region, scanning is executed and scanned data is stored into the temporary storage region.

Processing of steps S55 to S58 is the same as the processing of steps S35 to S38 illustrated in FIG. 7.

For example, when the terminal apparatus 14 accesses the temporary storage region, the list of scanned data stored in the temporary storage region is displayed on the display part of the UI unit 50 of the terminal apparatus 14. Every time that scanning is executed and scanned data is stored into the temporary storage region, the scanned data is added to the list.

Furthermore, when the terminal apparatus 14 accesses the temporary storage region, the storage controller 46 of the server 12 may associate terminal identification information of the terminal apparatus 14 with the temporary storage region. Then, when scanning is execute and scanned data is stored into the temporary storage region, the storage controller 46 causes an image for allowing the user to issue an instruction for downloading, such as a download button, to be displayed on the display part of the UI unit 50 of the terminal apparatus 14 that includes the terminal identification information associated with the temporary storage region. For example, when the scanned data is stored into the temporary storage region, the image is displayed by pop-up display. When the user operates the image to issue an instruction for downloading, the terminal apparatus 14 downloads scanned data stored in the temporary storage region. The above-mentioned list may be displayed during execution of scanning.

Example 3

Figure 9:
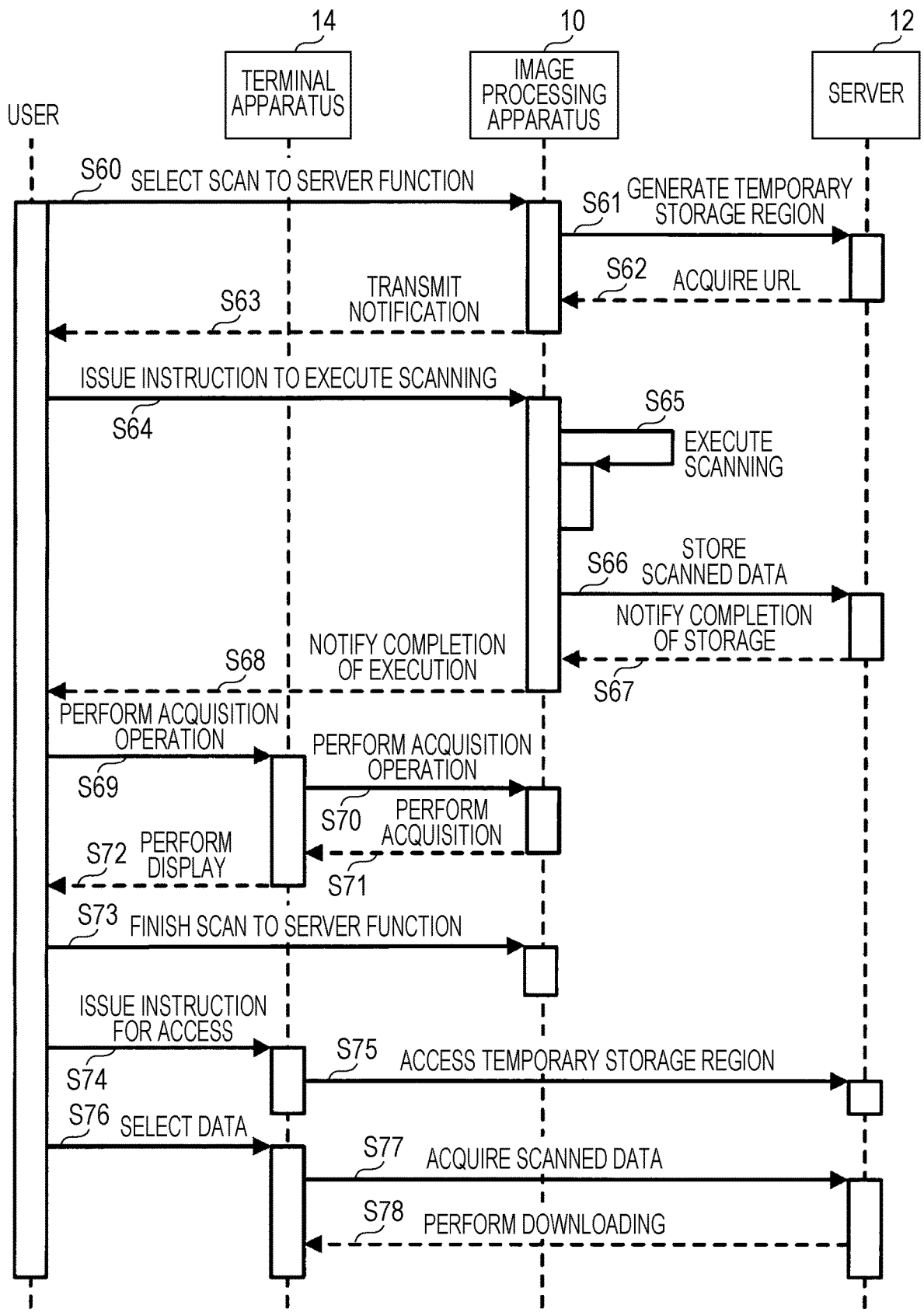
FIG. 9 is a sequence diagram illustrating the flow of a process according to Example 3.

Next, a process according to Example 3 will be described with reference to FIG. 9. FIG. 9 is a sequence diagram illustrating an example of the flow of the process according to Example 3.

In Example 1 described above, after the terminal apparatus 14 downloads scanned data from the server 12, execution of the "scan to server function" is finished. In Example 3, after execution of the "scan to server function" is finished, the terminal apparatus 14 downloads scanned data from the server 12. The process according to Example 3 will be described in detail below.

Processing of steps S60 to S72 is the same as the processing of steps S20 to S32 illustrated in FIG. 7.

Example 3, after the terminal apparatus 14 acquires access information, a user issues an instruction to finish execution of the "scan to server function" (S73), and the controller 28 of the image processing apparatus 10 finishes execution of the "scan to server function".

In Example 3, even after execution of the "scan to server function" is finished, the temporary storage region is not deleted.

After execution of the "scan to server function" is finished, processing of steps S74 to S78 is performed. The processing of steps S74 to S78 is the same as the processing of steps S33 to S37 illustrated in FIG. 7. That is, in Example 3, after execution of the "scan to server function" is finished, the terminal apparatus 14 downloads scanned data from the server 12.

For example, the temporary storage region may be deleted when a predetermined period has passed since the date and time at which the temporary storage region was generated, may be deleted when a predetermined period has passed since the point in time at which execution of the "scan to server function" was finished, may be deleted when the scanned data stored in the temporary storage region is downloaded by the terminal apparatus 14, or may be deleted when a user who has been logged in to the image processing apparatus 10 is logged out of the image processing apparatus 10.

Example 4

Figure 10:
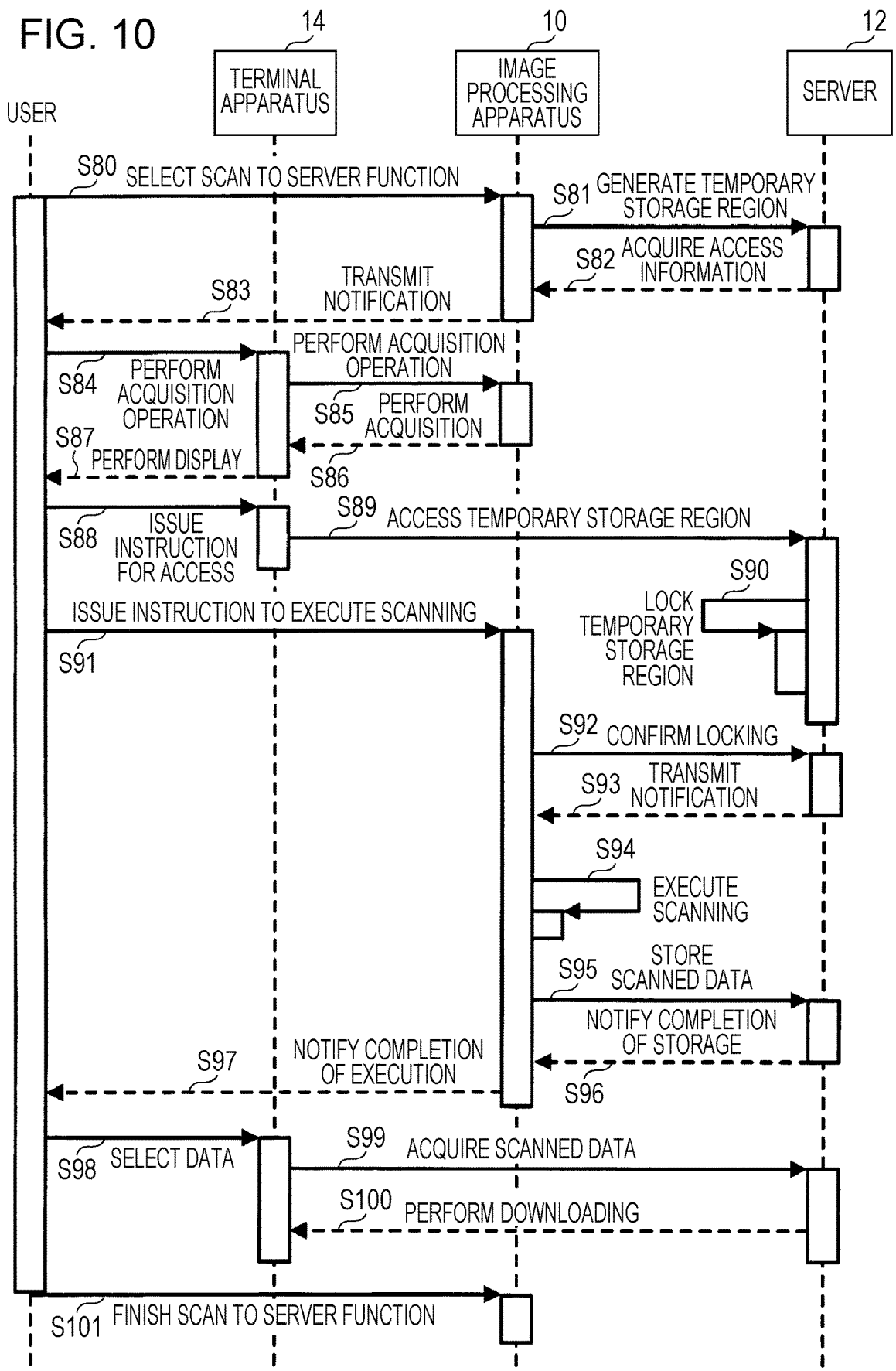
FIG. 10 is a sequence diagram illustrating the flow of a process according to Example 4.

Next, a process according to Example 4 will be described with reference to FIG. 10. FIG. 10 is a sequence diagram illustrating an example of the flow of the process according to Example 4.

In Example 4, the process is performed in the order of acquisition of access information by the terminal apparatus 14, access to a temporary storage region from the terminal apparatus 14, and execution of scanning by the image processing apparatus 10, as in Example 2.

Furthermore, in Example 4, in the case where access to a temporary storage region from a terminal apparatus 14 that is different from a terminal apparatus 14 that first accessed the temporary storage region based on access information is prohibited, execution of scanning is permitted. Hereinafter, prohibition of access to a temporary storage region from a terminal apparatus 14 that is different from a terminal apparatus 14 that first accessed the temporary storage region will be referred to as "locking". In the case where a temporary storage region is not locked, execution of scanning is not permitted. As another example, in the case where a temporary storage region is not locked, although execution of scanning is permitted, transmission of scanned data to the server 12 may be prohibited. The process according to Example 4 will be described in detail below.

Processing of steps S80 to S88 is the same as the processing of steps S40 to S48 illustrated in FIG. 8.

In Example 4, when receiving an instruction to access a temporary storage region from a user, the terminal apparatus 14 accesses, based on the access information, the temporary storage region generated in the server 12, and transmits terminal identification information of the terminal apparatus 14 to the server 12 (S89).

In the case where the temporary storage region accessed from the terminal apparatus 14 is not associated with terminal identification information of any other terminal apparatuses 14, the terminal apparatus 14 is the terminal apparatus that first accessed the temporary storage region. In this case, the access prohibition unit 42 locks the temporary storage region while associating the temporary storage region with the terminal identification information of the terminal apparatus 14, so that access to the temporary storage region from the other terminal apparatuses 14 is prohibited (S90). Accordingly, only the terminal apparatus 14 that includes the terminal identification information associated with the temporary storage region is permitted to access the temporary storage region, whereas the other terminal apparatuses 14 that do not include the terminal identification information are not permitted to access the temporary storage region.

In contrast, in the case where terminal identification information of a different terminal apparatus 14 is associated with the temporary storage region accessed from the terminal apparatus 14, the terminal apparatus 14 is not the terminal apparatus that first accessed the temporary storage region. In this case, the access prohibition unit 42 prohibits access to the temporary storage region from the terminal apparatus 14.

Next, at the image processing apparatus 10, when the user issues, using the UI unit 18, an instruction to execute scanning (S91), the storage controller 30 of the image processing apparatus 10 confirms whether or not the temporary storage region is locked (S92). For example, the storage controller 30 transmits information querying whether or not the temporary storage region locked (that is, information querying whether or not the terminal identification information of the terminal apparatus 14 is associated with the temporary storage region) to the server 12. The access prohibition unit 42 notifies the image processing apparatus 10 of a response to the query (S93). In the case where the temporary storage region is locked, that is, in the case where the terminal identification information of the terminal apparatus 14 is associated with the temporary storage region, the access prohibition unit 42 transmits information indicating that the temporary storage region is locked to the image processing apparatus 10. In the case where the temporary storage region is not locked, that is, in the case where the terminal identification information of the terminal apparatus 14 is not associated with the temporary storage region, the access prohibition unit 42 transmits information indicating that the temporary storage region is not locked to the image processing apparatus 10.

In the case where the temporary storage region is locked, the controller 28 of the image processing apparatus 10 permits the image reading unit 20 to execute scanning. In this case, the image reading unit 20 executes scanning (S94), and the storage controller 30 transmits scanned data to the server 12 and causes the scanned data to be stored into the temporary storage region (S95). Processing of steps S96 and S97 is the same as the processing of steps S27 and S28 illustrated in FIG. 7.

In the case where the temporary storage region is not locked, the controller 28 of the image processing apparatus 10 prohibits the image reading unit 20 from executing scanning. In this case, the controller 28 may cause information prompting the user to access the temporary storage region to be displayed on the display part of the UI unit 18 of the image processing apparatus 10. In the case where the temporary storage region is not locked, scanning may be permitted, and transmission of scanned data to the server 12 may be prohibited.

For example, for generation of a temporary storage region in the server 12, apparatus identification information of the image processing apparatus 10 that has issued an instruction to generate the temporary storage region is transmitted from the image processing apparatus 10 to the server 12 and is associated with the generated temporary storage region. The storage controller 30 of the image processing apparatus 10 transmits information querying whether or not the temporary storage region associated with the apparatus identification information of the image processing apparatus 10 is locked and the apparatus identification information of the image processing apparatus 10 to the server 12. In the case where terminal identification information is associated with the temporary storage region associated with the apparatus identification information, the access prohibition unit 42 determines that the temporary storage region is locked and thus transmits information indicating that the temporary storage region is locked to the image processing apparatus 10. In contrast, in the case where no terminal identification information is associated with the temporary storage region associated with the apparatus identification information, the access prohibition unit 42 determines that the temporary storage region is not locked and thus transmits information indicating that the temporary storage region is not locked to the image processing apparatus 10.

Processing of steps S98 to S101 is the same as the processing of steps S55 to S58 illustrated in FIG. 8.

In the case where the terminal apparatus 14 that includes the terminal identification information associated with the temporary storage region tries to access the temporary storage region, the terminal apparatus 14 is permitted to access the temporary storage region and is thus able to download scanned data stored in the temporary storage region. In the case where a different terminal apparatus 14 that does not include the terminal identification information tries to access the temporary storage region, the different terminal apparatus 14 is prohibited from accessing the temporary storage region and is thus not able to download scanned data stored in the temporary storage region.

Functions of the units of the image processing apparatus 10, the server 12, and the terminal apparatus 14 mentioned above are implemented by collaboration of hardware and software, for example. Specifically, the image processing apparatus 10, the server 12, and the terminal apparatus 14 each include one or more processors such as CPUs, which are not illustrated in drawings. When the one or more processors read and execute a program stored in a storage device, which is not illustrated in drawings, functions of the units of the image processing apparatus 10, the server 12, and the terminal apparatus 14 are implemented. The above-mentioned program is stored in the storage device via a recording medium such as a compact disc (CD) or a digital versatile disc (DVD) or through a communication path such as a network. As another example, functions of the units of the image processing apparatus 10, the server 12, and the terminal apparatus 14 may be implemented by hardware resources such as a processor, an electronic circuit, or an application specific integrated circuit (ASIC). In the implementation by such hardware resources, a device such as a memory may be used. As still another example, functions of the units of the image processing apparatus 10, the server 12, and the terminal apparatus 14 may be implemented by a digital signal processor (DSP) or a field programmable gate array (FPGA).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a reading unit comprising a scanner or a camera, the reading unit provided to read a reading target to generate image data; and
    at least one processor configured to function as:
        a generation processing unit that performs processing for generating, in an external apparatus, a temporary storage region that is able to be accessed from a terminal apparatus;
        a storage controller that transmits the image data to the external apparatus and causes the image data to be stored into the temporary storage region; and
        an output unit that outputs access information for allowing the terminal apparatus to access the temporary storage region, the access information being output in a state in which the access information is able to be acquired by the terminal apparatus,
    wherein in a case where access to the temporary storage region from a terminal apparatus that is different from the terminal apparatus that has first accessed the temporary storage region based on the access information is prohibited, the reading unit reads the reading target to generate the image data, and
    wherein a period during which the output unit outputs the access information is a period from a point in time at which the access information is acquired to a point in time at which a generation condition for generating the temporary storage region is finished.

2. The information processing apparatus according to claim 1,
    wherein the processing for generating a temporary storage region is instructing the external apparatus to generate the temporary storage region.

3. The information processing apparatus according to claim 2,
    wherein the storage controller causes one or more image data generated by the reading unit during a period from beginning of execution of a function for generating a temporary storage region in the external apparatus and causing the image data to be stored into the temporary storage region to ending of the execution of the function to be stored into the same temporary storage region.

4. The information processing apparatus according to claim 2,
    wherein after a function for generating a temporary storage region in the external apparatus and causing the image data to be stored into the temporary storage region is finished and before the function is executed next time, the generation processing unit performs processing for generating, in the external apparatus, another temporary storage region to be used when the function is executed next time.

5. The information processing apparatus according to claim 2,
    wherein during a period from beginning of execution of a function for generating a temporary storage region in the external apparatus and causing the image data to be stored into the temporary storage region to ending of the execution of the function, the output unit outputs the access information.

6. The information processing apparatus according to claim 2,
    wherein when a function for generating a temporary storage region in the external apparatus and causing the image data to be stored into the temporary storage region is finished, the generation processing unit further performs processing for deleting the temporary storage region from the external apparatus.

7. The information processing apparatus according to claim 2,
    wherein a function for generating a temporary storage region in the external apparatus and causing the image data to be stored into the temporary storage region is a function that becomes available when a user is logged in to the information processing apparatus, and
    wherein in a case where the temporary storage region is generated in the external apparatus by execution of the function during a period from a point in time at which the user is logged in to the information processing apparatus to a point in time at which the user is logged out of the information processing apparatus, when the user is logged out of the information processing apparatus and then logged in to the information processing apparatus again, the generation processing unit further performs processing for deleting the temporary storage region from the external apparatus.

8. The information processing apparatus according to claim 1,
    wherein the processing for generating a temporary storage region is specifying, as identification information of the temporary storage region, identification information that is not the same as identification information of other temporary storage regions and instructing the external apparatus to generate the temporary storage region.

9. The information processing apparatus according to claim 1,
wherein the storage controller causes one or more image data generated by the reading unit during a period from beginning of execution of a function for generating a temporary storage region in the external apparatus and causing the image data to be stored into the temporary storage region to ending of the execution of the function to be stored into the same temporary storage region.

10. The information processing apparatus according to claim 1,
wherein after a function for generating a temporary storage region in the external apparatus and causing the image data to be stored into the temporary storage region is finished and before the function is executed next time, the generation processing unit performs processing for generating, in the external apparatus, another temporary storage region to be used when the function is executed next time.

11. The information processing apparatus according to claim 1,
wherein during a period from beginning of execution of a function for generating a temporary storage region in the external apparatus and causing the image data to be stored into the temporary storage region to ending of the execution of the function, the output unit outputs the access information.

12. The information processing apparatus according to claim 1,
wherein when a function for generating a temporary storage region in the external apparatus and causing the image data to be stored into the temporary storage region is finished, the generation processing unit further performs processing for deleting the temporary storage region from the external apparatus.

13. The information processing apparatus according to claim 1,
wherein a function for generating a temporary storage region in the external apparatus and causing the image data to be stored into the temporary storage region is a function that becomes available when a user is logged in to the information processing apparatus, and
wherein in a case where the temporary storage region is generated in the external apparatus by execution of the function during a period from a point in time at which the user is logged in to the information processing apparatus to a point in time at which the user is logged out of the information processing apparatus, when the user is logged out of the information processing apparatus and then logged in to the information processing apparatus again, the generation processing unit further performs processing for deleting the temporary storage region from the external apparatus.

14. The information processing apparatus according to claim 1,
wherein a single temporary storage region is able to be used for each execution of a function for generating a temporary storage region in the external apparatus and causing the image data to be stored into the temporary storage region.

15. The information processing apparatus according to claim 1,
wherein in a case where a user deletes access information that is included in information indicating operation history that is displayed to the user, the access information being information for accessing the temporary storage region, the generation processing unit performs processing for deleting the temporary storage region.

16. An information processing system comprising:
an information processing apparatus; and
an external apparatus,
wherein the information processing apparatus includes
a reading unit comprising a scanner or a camera, the reading unit provided to read a reading target to generate image data; and
at least one processor configured to function as:
a transmitting unit that transmits the image data to the external apparatus, and
an output unit that outputs access information for allowing a terminal apparatus to access a temporary storage region generated in the external apparatus, the access information being output in a state in which the access information is able to be acquired by the terminal apparatus, and
wherein the external apparatus includes
a storing unit including a memory, and
at least one processor configured to function as:
a generation unit that generates, in the storing unit, the temporary storage region that is able to be accessed from the terminal apparatus,
a storage controller that causes the image data transmitted to the external apparatus by the transmitting unit to be stored into the temporary storage region, and
an access prohibition unit that prohibits access to the temporary storage region from a terminal apparatus that is different from the terminal apparatus that has first accessed the temporary storage region based on the access information,
wherein in a case where access to the temporary storage region from the terminal apparatus that is different from the terminal apparatus that has first accessed the temporary storage region is prohibited, the reading unit reads the reading target to generate the image data, and
wherein a period during which the output unit outputs the access information is a period from a point in time at which the access information is acquired to a point in time at which a generation condition for generating the temporary storage region is finished.

17. The information processing system according to claim 16,
wherein the at least one processor of the external apparatus is further configured to function as:
a deletion unit that deletes, when a notification indicating that a function for generating a temporary storage region in the external apparatus and causing the image data to be stored into the temporary storage region is finished is received from the information processing apparatus, the temporary storage region.

18. The information processing system according to claim 16,
wherein the at least one processor of the external apparatus is further configured to function as:
a deletion unit that deletes, when the terminal apparatus acquires the image data stored in the temporary storage region, the temporary storage region.

19. A non-transitory computer readable medium storing a program causing a computer to execute processing for information processing, the process comprising:
reading a reading target to generate image data;

performing processing for generating, in an external apparatus, a temporary storage region that is able to be accessed from a terminal apparatus;
transmitting the image data to the external apparatus and causes the image data to be stored into the temporary storage region; and
outputting access information for allowing the terminal apparatus to access the temporary storage region, the access information being output in a state in which the access information is able to be acquired by the terminal apparatus,
wherein in a case where access to the temporary storage region from a terminal apparatus that is different from the terminal apparatus that has first accessed the temporary storage region based on the access information is prohibited, the reading includes reading the reading target to generate the image data, and
wherein a period during which the outputting the access information occurs is a period from a point in time at which the access information is acquired to a point in time at which a generation condition for generating the temporary storage region is finished.

* * * * *